United States Patent [19]

Deveaux

[11] Patent Number: 4,860,401
[45] Date of Patent: Aug. 29, 1989

[54] DIPSTICK WIPER

[76] Inventor: George A. Deveaux, 100 Century Drive, Unit 2, Orangeville, Ontario, Canada, L9W 4L1

[21] Appl. No.: 251,359

[22] Filed: Sep. 30, 1988

[51] Int. Cl.$^4$ .............................................. G01F 15/12
[52] U.S. Cl. .............................. 15/210 B; 15/236.09; 33/729
[58] Field of Search ............ 15/210 B, 236.01, 236.09; 33/126.7 R

[56] References Cited

U.S. PATENT DOCUMENTS

| | | | |
|---|---|---|---|
| 2,029,672 | 2/1936 | Rankin | 15/210 BX |
| 2,855,682 | 10/1958 | Norgard | 15/210 BX |
| 3,591,886 | 7/1971 | Denver | 15/210 B |
| 4,419,781 | 12/1983 | Meegan | 15/210 B |
| 4,558,520 | 12/1985 | Forde, Jr. | 15/210 BX |

FOREIGN PATENT DOCUMENTS 771402 4/1957 United Kingdom ............ 15/210 B

*Primary Examiner*—Edward L. Roberts
*Attorney, Agent, or Firm*—Fetherstonhaugh & Co.

[57] ABSTRACT

A dipstick wiper is provided for use in association with a dipstick of the type having an elongated blade which is proportioned to extend through an open end of an access passage of an access tube into a fluid reservoir for the purposes of determining the level of fluid in the reservoir. The dipstick wiper is in the form of a stopper for stopping the open end of the access passage of the access tube. A seat is formed in the lower end of the stopper for receiving the open end of the access tube in a close-fitting relationship to mount the stopper at the open end of the access tube in a position in which it stops the access passage. First and second through passages open through the stopper. The first through passage is proportioned to accommodate a blade of a dipstick in a close fitting sliding relationship so as to serve to wipe the blade clean when it passes therethrough. The second through passage is proportioned to permit the blade of a dipstick to pass freely therethrough without cleaning the blade such that the liquid which adheres to the blade during the liquid level testing operation is not removed.

13 Claims, 2 Drawing Sheets

DIPSTICK WIPER

This invention relates to a dipstick wiper. In particular, this invention relates to a dipstick wiper which can be used in association with a conventional access tube of the engine of a motor vehicle or the like.

Numerous attempts have been made to provide dipstick wipers which will permit the oil to be removed from the dipstick as it is withdrawn from the access package.

One such prior device is disclosed in U.S. Pat. No. 2,029,672 dated Feb. 4, 1936, H. L. Rankin. In this device, a flexible sponge is mounted in the housing and has a slot which opens from one side thereof into which the dipstick is inserted when it is to be cleaned as it is withdrawn. This is a complex mechanism which is not suitable for use in association with a conventional access tube and requires a specially designed crankcase extension. The Rankin device is a complex multi-part structure which is expensive to manufacture and install. In addition, because the felt member is exposed, at all times it will become contaminated with particles of grit and the like which will adhere the oil with which it is saturated and this will eventually migrate to the interior of the crankcase through the opening which is not obscured by the felt member. In addition, because of the fact that it is necessary to move the wiper blade laterally, the portion of the passage which is used for measuring the oil level and the portion of the passage which is still used for cleaning the blade, it is necessary to provide a very wide access passage which cannot easily be accommodated in a conventional circular access tube of the type provided in internal combustion engines.

U.S. Pat. No. 3,591,886 discloses a dipstick wiper attachment which is suitable for use in association with the access tube of an internal combustion engine, however, this device requires the user to manually pinch the upper end of the tubular device as the blade is being withdrawn. The environment in which an internal combustion engine operates is such that grit and oil contaminating substances can accumulate in the cup section of this device and this accumulation will migrate to or be driven through the access tube by the dipstick as it is reintroduced.

It is an object of the present invention to provide a simple and inexpensive dipstick wiper for use on the access tube of a fluid reservoir.

It is a further object of the present invention to provide a dipstick wiper in the form of a stopper which has two through passages for admitting the dipstick, the through passages being arranged in a side-by-side relationship and separated from one another by a barrier wall.

According to one aspect of the present invention, there is provided in a dipstick wiper for use in association with a dipstick of the type having an elongated blade which is proportioned to extend through an open end of an access passage of an access tube into a fluid reservoir for the purposes of determining the level of fluid in the reservoir comprising a stopper for stopping the open end of the access passage of the access tube, said stopper having an upper end and a lower end, a seat formed in the lower end of the stopper for receiving the open end of the access tube in a close-fitting relationship to mount the stopper at the open end of the access tube in a position in which it stops the access passage, first and second through passages opening through said stopper from said upper end to said lower end, said first passage being proportioned to accommodate a blade of a dipstick in a close fitting sliding relationship so as to serve to wipe the blade clean when it passes therethrough in use, said second passage being proportioned to permit the blade of a dipstick to pass freely therethrough without cleaning the blade such that the liquid which adheres to the blade during the liquid level testing operation is not removed.

According to a further aspect of the present invention, there is provided in a liquid storage device in which a reservoir is formed and wherein an access tube is provided through which a liquid measuring access passage extends from an open end of the tube to the reservoir, the improvement of a dipstick having an elongated blade which has a distal end and a proximal end, a cap mounted on and extending outwardly from the blade in a datum plane which is spaced from the distal end of the blade, a stopper mounted had enclosing the open end of the access tube, said stopper having an upper end and a lower end, first and second through passages opening through said stopper into said access passage, said first through being proportioned to accommodate the blade of the dipstick in a close fitting sliding relationship so as to serve to wipe the blade clean when it passes therethrough, said second passage being proportioned to permit the blade of the dipstick to pass freely therethrough without cleaning the blade such that the liquid which adheres to the blade during the liquid level testing operation is not removed, said cap being proportioned to close the first and second through passages when the dipstick is inserted through the first passage to the extent that the cap bears against the upper end of the stopper.

The invention will be more clearly understood after reference to the following detailed specification read in conjunction with the drawings wherein.

Figure 1:
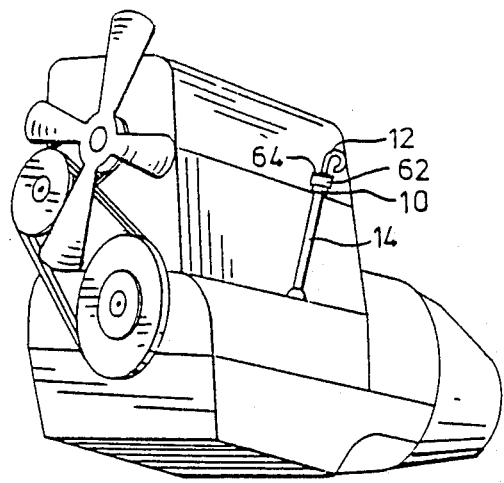
FIG. 1 is pictorial view of an engine of a motor vehicle illustrating a typical dipstick installation.

With reference to the drawings, reference numeral 10 refers generally to a dipstick wiper which is used in association with a dipstick 12 and an access tube 14.

Figure 2:
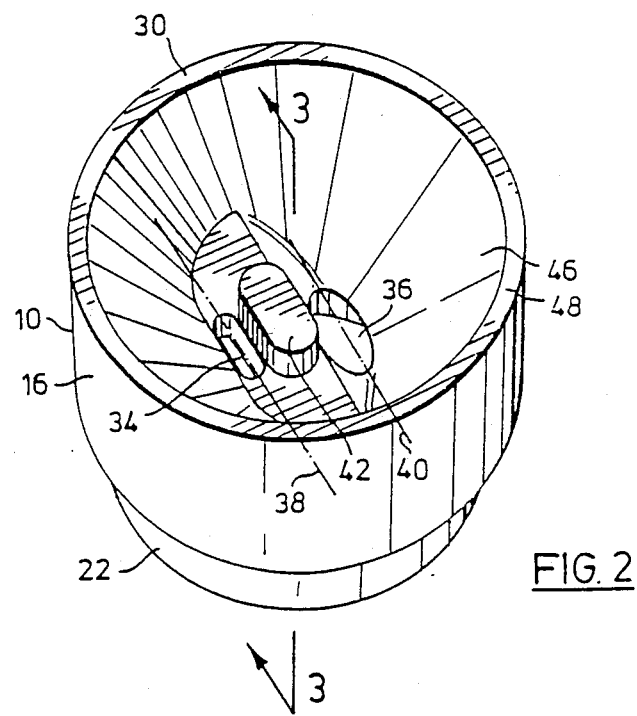
FIG. 2 is a plan view of a dipstick wiper constructed in accordance with an embodiment of the present invention.
Figure 4:
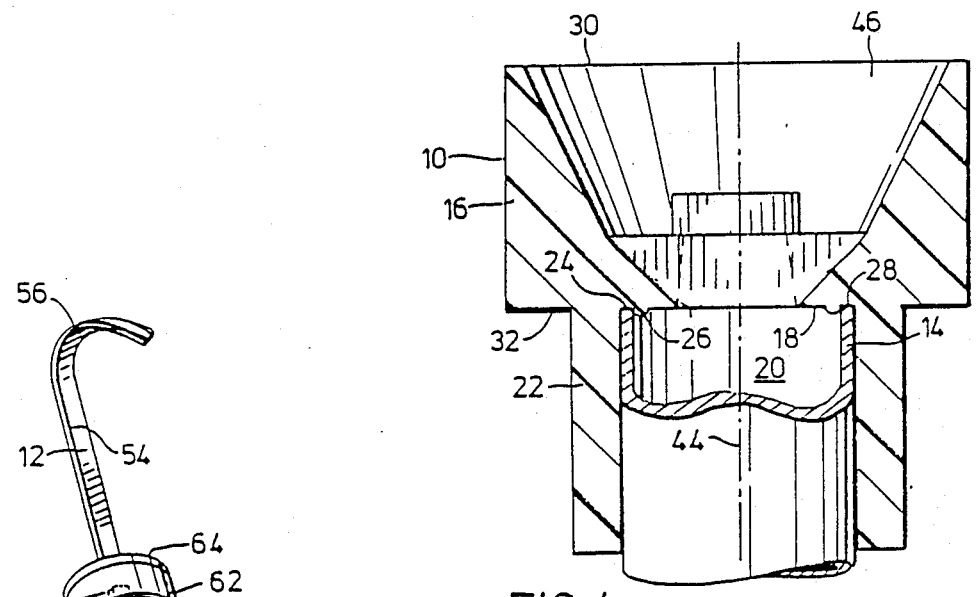
FIG. 4 is a sectional view taken along the line 4—4 of FIG. 2.
Figure 3:
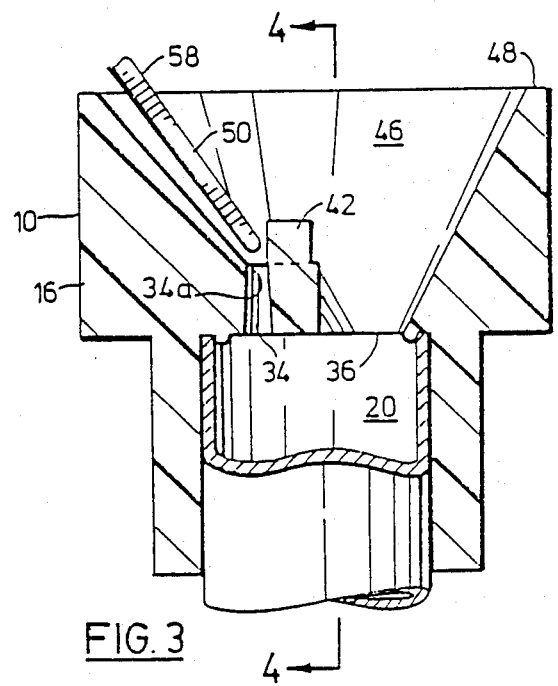
FIG. 3 is a sectional view taken along the line 3—3 of FIG. 2.

As shown in FIGS. 2, 3 and 4, the dipstick wiper 10 has a unitary body which includes head portion 16 which acts as a stopper for stopping the open end 18 of the access passage 20 of the access tube 14. The unitary body also provides a tubular collar portion 22 which projects from the head portion and has an internal diameter which is proportioned to receive the free end of the access tube 14 in a close fitting relationship. A shoulder 24 projects radially inwardly of the head portion 16 and a small raised ridge 26 extends around the inner perimeter of the shoulder 24. The raised ridge 26, shoulder 24 and the collar 22 cooperate with one another to form a seat 28 in the lower end of the stopper which serves to mount and retain the stopper on the free end of the tubular member 20 so that it will not be removed with the dipstick blade as the dipstick is withdrawn through either of the passages which are formed in the stopper in use.

The head portion 16 of the dipstick wiper has an upper end 30 and a lower end 32. First and second through passages 34 and 36 extend through the head portion 16 from the upper end 30 to the lower end 32.

The first passage 34 is proportioned to accommodate the blade of a dipstick in a close fitting sliding relationship so as to serve to wipe the blade clean when it passes therethrough in use. The second passage 36 is proportioned to permit the side faces of the blade of a dipstick to pass freely therethrough without cleaning the side faces of the blade such that the liquid which adheres to the blade during the liquid level testing operation is not removed. The first passage 34 is laterally elongated and has a transverse axis 38. The second passage 36 has an eliptical cross section which has a major axis 40. As shown in FIG. 2 of the drawings, the passages 34 and 36 are arranged in a side by side relationship with the axes 36 and 38 extending in a parallel relationship. This serves to arrange the passages in a compact array which can be accommodated within the confines of the access passage 20 of the access tube 14. A barrier wall 42 serves to separate the passage 34 and 36 and prevent lateral movement of the dipstick to and fro between the first and second passages.

The head portion 16 is circular in cross section and has its longitudinal axis 44 extending through the center thereof. The first access passage 42 which, as previously indicated, is proportioned to receive the dipstick in a close fitting relationship, has its axis 38 located more closely adjacent the axis 44 than is the axis 40 of the second passage 36. Because the second passage 36 is larger and does not restrict the dipstick blade, it is possible to locate this passage somewhat further off center of the access tube.

A drainage recess 46 is formed in the head 16 and extends downwardly from the upper end 30 to the passages 34 and 36 and is tapered to funnel fluid toward the passages 34 and 36.

With reference to FIG. 3 of the drawings, it will be seen that the barrier wall 42 projects upwardly beyond the upper end 34a of the passage 34. The portion of the barrier wall 42 which extends above the end 34a of the passage 34 serves as a deflector for deflecting the blade 50 of the dipstick into one or other of the passages 34 and 36. In the illustration shown in FIG. 3 the blade 50 is deflected into the passage 34 which, because it is the smaller of the two passages, is the more difficult passage to locate.

The head portion 16 has a flat end face 48 which extends about the perimeter of the drainage recess 46.

Figure 5:
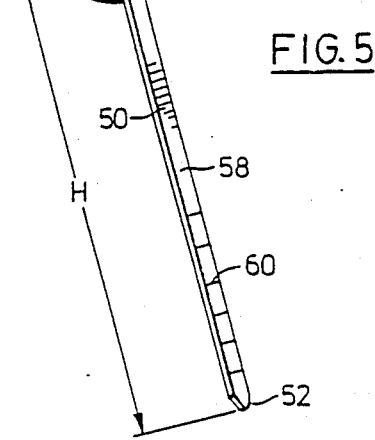
FIG. 5 is a pictorial view of a dipstick suitable for use in association with the dipstick wiper of FIG. 2.

As shown in FIG. 5 of the drawings, the dipstick 12 has an elongated blade portion 50 which has an upper end 52 and a lower end 54. A hook shaped handle 56 is formed at the lower end. The blade 50 has a generally rectangular cross sectional configuration which closely conforms to the configuration of the slot 34. The blade 50 has a front face 58 and a series of liquid level markings 60 are applied to the front face 58.

A cap 62 is mounted on and projects laterally from the blade 50 of the dipstick in the datum plane which is located at a predetermined height H from the distal end 52. The cap 62 has a cover plate portion 64 which is proportioned so that it will overlie the flat end face 48 of the head 16 when the dipstick blade 52 is inserted into either of the passages 34 or 36. As a consequence the coverplate 64 has a somewhat larger diameter than the head 16. This serves to insure that the cap 62 will close the upper end of the drainage recess 46 regardless of which of the passages the blade 50 extends in use. The cap 62 also has a skirt portion 66 which extends downwardly from the cover plate 62 and is arranged to be located outwardly from the side face of the head portion 16 when the cover plate is operably located on the end face 48.

In use the dipstick blade will normally be in a position to extend through the passage 34. This is not, however, the essential as the dipstick could be stored with the blade extending through the passage 36. When the liquid leved is to be tested the dipstick 30 is withdrawn and as a result of the withdrawal through the passage 34 the blade will be wiped clean. The dipstick will then be reintroduced through the passage 36 and because of the shape of the passage 36 only the edges of the dipstick can come into contact with the edges of the passage 36. The arcuate configuration of the side walls of the passages 36 will prevent contact between the face 58 of the blade and the side faces 36a of the passage 36. The dipstick is then extended into the reservoir in the usual manner until the cap 62 bears against the end face 48. Thereafter the dipstick is withdrawn through the passage 36 without cleaning the blade with a result that the liquid which adheres to the blade during the liquid level testing operation is not removed.

After testing the blade may then be reintroduced to the passage 34. This reintroduction will have the effect of wiping the fluid off of the blade. However, the fluid which is wiped off will be accumulated in the recess 46 and will drain into the access tube 14 through the passage 34 or the passage 36. It will also be apparent that any oil which drips from the dipstick blade as it is withdrawn either during initial wiping or during the testing will be accumulated in the recess 46 and will drain into the access passage 20.

Various modifications of the present invention will be apparent to those skilled in the art. In one such modification, a conventional hose clamp may be used to secure the collar 22 to the free end of the access tube 14.

From the aforegoing it will be apparent that the present invention provides a simple and inexpensive dipstick wiper suitable for use in association with the conventional access tube of a fluid reservoir such as the crank case of an internal combustion engine or the like. The dipstick wiper of the present invention may be used in association with existing dipstick tubes and dipsticks or it may be incorporated as an original piece of equipment in an engine assembly. In the former case, it may be necessary to make adjustments with respect to the depth markings to compensate for the extent to which the dipstick wiper projects above the upper end of the access tube which usually forms the datum face from which the depth markings of the dipstick blade are measured. These and other modifications will be apparent to those skilled in the art.

I claim:

1. A dipstick wiper for use in association with a dipstick of the type having an elongated blade which is proportioned to extend through an open end of an access passage of an access tube into a fluid reservoir for the purposes of determining the level of fluid in the reservoir comprising;
   (a) a stopper for stopping the open end of the access passage of the access tube, said stopper having an upper end and a lower end, (b) a seat formed in the lower end of the stopper for receiving the open end of the access tube in a close-fitting relationship to mount the stopper at the open end of the access tube in a position in which it stops the access passage, (c) first and second through passages opening through said stopper from said upper end to said lower end, (d) said first passage being proportioned to accommodate a blade of a dipstick in a close fitting sliding relationship so as to serve to wipe the blade clean when it passes therethrough in use, (e) said second passage being proportioned to permit the blade of a dipstick to pass freely therethrough without cleaning the blade such that the liquid which adheres to the blade during the liquid level testing operation is not removed.

2. A dipstick wiper as claimed in claim 1, wherein said first and second passages are arranged in a side-by-side relationship and are separated from one another by a barrier wall which prevents lateral movement of the dipstick to and fro between the first and second passages to prevent accidental cleaning of the blade when it is withdrawn through the second passage.

3. A dipstick wiper as claimed in claim 1, wherein said stopper is formed from a unitary body.

4. A dipstick wiper as claimed in claim 1, wherein said first and second passages are laterally elongated and each has a major axis extending in the direction of its lateral elongation, said first and second passages being arranged in a side-by-side relationship with their major axes extending substantially parallel to one another such that the passages are arranged in a compact array which can be accommodated within the confines of the access passage of a conventional access tube of the type commonly used for providing access to the sump of an internal combustion engine.

5. A dipstick wiper as claimed in claim 4, wherein said stopper is cylindrical in shape and has a central axis, said first and second passages being arranged such that the major axis of the first passage is arranged more closely adjacent to the central axis of the stopper than is the major axis of the second passage, to minimize the extent to which the dipstick is distorted as it passes along the access passage of the access tube when it extends through the first through passage.

6. A dipstick wiper as claimed in claim 1, wherein the cross-sectional configuration of the second passage differs substantially from that of the blade of the dipstick such that the side faces of the dipstick on which depth scale marks appear will not make contact with the side face of the second passage.

7. A dipstick wiper as claimed in claim 6, for use with a dipstick of the type which has a generally rectangular cross-sectional configuration wherein the cross-sectional configuration of the second passage is substantially elliptical such that the side faces of the dipstick cannot be located in a face-to-face relationship with respect to the side faces of the dipstick thereby to prevent accidental cleaning of the dipstick during its removal.

8. A dipstick wiper as claimed in claim 1, having a drainage recess formed at the upper end of the stopper, the drainage recess communicating with said first and second passages to drain the fluids which accumulate above the wiper in use, through the first and second passages into the access passage of the access tube.

9. A dipstick wiper as claimed in claim 8, wherein the drainage recess has side walls which converge downwardly toward the first and second access passages.

10. A dipstick wiper as claimed in claim 9, for use in association with a dipstick which has a cover plate which projects outwardly therefrom and wherein the drainage recess is proportioned to be smaller in area that the cover of the dipstick so as to be covered thereby when the dipstick is operably located therein to prevent the accumulation of contaminating substances in the drainage recess.

11. A dipstick wiper comprising a stopper for stopping the open end of an access passage of an access tube of an oil reservoir, first and second passages opening through said body from said upper end to said lower end, said first passage being proportioned to accommodate a dipstick in a close-fitting sliding relationship so as to wipe the stick clean when in passes therethrough, said second passage being proportioned to permit the dipstick to pass freely therethrough without cleaning the stick such that liquid which adheres to the stick during the level testing is not removed as the stick is withdrawn through the second passage.

12. A dipstick wiper for use in association with a dipstick of the type having an elongated blade and a cap mounted on the blade which is arranged to fit over the open end of an access tube to close the access passage which extends through the tube to a fluid reservoir comprising a unitary body having an upper end and a lower end, a collar projecting from the lower end of the body, said collar being proportioned to receive the access tube and having a shoulder which extends inwardly thereof to form a seat which bears against the end of the access tube too support the body thereon, first and second access passages opening through said body from said upper end to said lower end, said first access passage being proportioned to accommodate the blade of the dipstick in a close fitting sliding relationship to wipe the blade clean as it passes therethrough, said second passage being proportioned to permit the blade of the dipstick to pass freely therethrough without cleaning the dipstick such that liquid which adheres to the dipstick during the liquid level testing is not removed as the blade is withdrawn through the second passage.

13. In a liquid storage device in which a reservoir is formed and wherein an access tube is provided through which a liquid measuring access passage extends from an open end of the tube to the reservoir, the improvement of;

(a) a dipstick having an elongated blade which has a distal end and a proximal end, (b) a cap mounted on and extending outwardly from the blade in a datum plane which is placed from the distal end of the blade, (c) a stopper mounted head enclosing the open end of the access tube, said stopper having an upper end and a lower end, (d) first and second through passages opening through said stopper into said access passage, (e) said first through passage being proportioned to accommodate the blade of the dipstick in a close fitting sliding relationship so as to serve to wipe the blade clean when it passes therethrough, (f) said second passage being proportioned to permit the blade of the dipstick to pass freely therethrough without cleaning the blade such that a liquid which adheres to the blade during the liquid level testing operation is not removed, (g) said cap being proportioned to close the first and second through passages when the dipstick is inserted through the first passage to the extent that the cap bears against the upper end of the stopper.

* * * * *